United States Patent
Bannow

(10) Patent No.: US 11,042,143 B2
(45) Date of Patent: Jun. 22, 2021

(54) METHOD AND DEVICE FOR DETECTING ERRORS OCCURRING DURING COMPUTING DATA MODELS IN SAFETY-CRITICAL SYSTEMS

(71) Applicant: Robert Bosch GmbH, Stuttgart (DE)

(72) Inventor: Nico Bannow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/272,014

(22) Filed: Feb. 11, 2019

(65) Prior Publication Data

US 2019/0250578 A1 Aug. 15, 2019

(30) Foreign Application Priority Data

Feb. 12, 2018 (DE) .......................... 102018202093.0

(51) Int. Cl.
*G06F 11/16* (2006.01)
*G05B 19/048* (2006.01)
(Continued)

(52) U.S. Cl.
CPC ........... *G05B 19/048* (2013.01); *G05B 17/02* (2013.01); *G05B 19/0428* (2013.01); *G05B 9/02* (2013.01);
(Continued)

(58) Field of Classification Search
CPC .. G06N 3/08; G06N 3/10; G06F 17/17; G06F 17/175; G06F 17/18; G06F 11/0754;
(Continued)

(56) References Cited

U.S. PATENT DOCUMENTS

| 2004/0088708 | A1* | 5/2004 | Ramanujam | G06F 9/505 718/107 |
| 2007/0100475 | A1* | 5/2007 | Korchinski | G05B 17/02 700/28 |

(Continued)

FOREIGN PATENT DOCUMENTS

DE 102013212842 A1 1/2015

*Primary Examiner* — Joseph O Schell
(74) *Attorney, Agent, or Firm* — Norton Rose Fulbright US LLP; Gerard Messina

(57) ABSTRACT

A device for computing data models, in particular comprising the possibility to detect errors occurring during the computation, has at least two processing units, at least one of the at least two processing units being designed to compute a main data model as a function of at least one state of a system, at least one other of the at least two processing units being designed to compute, as a function of this at least one state of the system, an approximation data model associated with the main data model, the main data model comprising at least one property of the system as a first data model, the approximation data model comprising at least the same property of the system approximately as a second data model, a comparator unit being designed to compare a first result of a first computation of the main data model with a second result of a second computation of the approximation data model associated with the main data model, in order to determine information about a deviation between the first result and the second result, the comparator unit being designed to detect an error as a function of the information about the deviation if the deviation exceeds a maximum admissible deviation.

15 Claims, 2 Drawing Sheets

(51) Int. Cl.
    *G05B 19/042*     (2006.01)
    *G05B 17/02*     (2006.01)
    *G05B 9/02*     (2006.01)
    *G06F 11/07*     (2006.01)
    *G06F 8/41*     (2018.01)

(52) U.S. Cl.
    CPC ............. *G05B 2219/23456* (2013.01); *G05B 2219/24024* (2013.01); *G05B 2219/25252* (2013.01); *G05B 2219/25257* (2013.01); *G06F 8/443* (2013.01); *G06F 11/0754* (2013.01); *G06F 11/1629* (2013.01)

(58) Field of Classification Search
    CPC ............. G06F 11/1641; G06F 11/1695; G06F 11/3608; G06F 11/3612; G06F 11/3616; G06F 8/443
    See application file for complete search history.

(56) References Cited

U.S. PATENT DOCUMENTS

| | | |
|---|---|---|
| 2008/0312790 A1 | 12/2008 | Fey et al. |
| 2009/0187302 A1* | 7/2009 | Takenaka ............. B60T 8/1755 701/33.8 |
| 2010/0088058 A1* | 4/2010 | Fricke ............... G01M 17/0074 702/113 |
| 2011/0218654 A1* | 9/2011 | Trautmann ............. G06F 8/443 700/31 |
| 2015/0227658 A1* | 8/2015 | Persson .................. G06F 17/10 703/2 |
| 2016/0232261 A1* | 8/2016 | Furuya .................. G06F 30/20 |
| 2017/0140078 A1* | 5/2017 | Yang ....................... G06F 30/00 |
| 2018/0134269 A1* | 5/2018 | Monschein ........... F16D 65/847 |
| 2018/0288440 A1* | 10/2018 | Chao ....................... G06T 9/001 |
| 2018/0370540 A1* | 12/2018 | Yousuf ............... B60W 50/023 |

* cited by examiner

METHOD AND DEVICE FOR DETECTING ERRORS OCCURRING DURING COMPUTING DATA MODELS IN SAFETY-CRITICAL SYSTEMS

FIELD OF THE INVENTION

The present invention relates to a method and a device for computing data models in particular comprising the possibility to detect errors occurring during the computation in safety-critical systems.

BACKGROUND INFORMATION

In safety-critical systems, for example in an automobile, it is important to detect the occurrence of safety-relevant errors in order to be able to react to the errors with an appropriate response. For example, the response to the detection of an error may be to switch off power units.

In digital HW circuits, transient errors, i.e. temporary errors such as e.g. a single flipped bit, or permanent, i.e. enduring, errors may occur.

Depending on the safety requirement, the errors must be detected with a certain probability and handled accordingly so that these detected errors will not affect the safety-critical systems. In the automotive environment, these requirements are described by the Automotive Safety Integrity Level ASIL.

To detect errors, it is possible for example to compute the same algorithm on two different digital processing units of the same kind. The disadvantage here is a duplication of the hardware expenditure, i.e. of the silicon surface and correspondingly higher costs.

Data-based models model the properties of physical systems in that the behavior of the systems is observed and measured in a prior step. In the process, a relationship is established between input data and an output behavior. This information is stored for example as characteristics maps and may be retrieved in the operation of the safety-critical system.

German Published Patent Application No. 102013212842 A1 discloses in this regard a control unit in which a model computation unit computes data-based functional models and relieves a main processing unit.

An error in a digital circuit in a computation of a data-based model in a safety-critical system may be detected by redundant computation of the data-based model. The computations necessary for this purpose require great hardware expenditure.

Some types of data models may be split up into partial data models for the purpose of computation, it subsequently being possible to recombine the partial data models into a unified model. Such partial data models are likewise referred to as data models below. The comparisons, likewise described below, of the computation of these data models always also comprise the results of data models, partial data models as well as entirely or partially combined partial data models.

A desirable result in the computation of data-based models in safety-critical systems is an error detection that can be implemented at a clearly reduced hardware expenditure compared to a fully redundant computation.

SUMMARY

This is achieved by a device and a method.

The device for computing data models, in particular comprising the possibility to detect errors occurring during the computation, has at least two processing units, at least one of the at least two processing units being designed to compute a main data model as a function of at least one state of a system, at least one other of the at least two processing units being designed to compute, as a function of this at least one state of the system, an approximation data model associated with the main data model, the main data model comprising at least one property of the system as a first data model, the approximation data model comprising at least the same property of the system approximately as a second data model, a comparator unit being designed to implement the following method: comparing a first result of a first computation of the main data model with a second result of a second computation of the approximation data model associated with the main data model, determining information about a deviation between the first result and the second result, detecting an error as a function of the information about the deviation if the deviation exceeds a maximum admissible deviation. The redundant hardware formed by the at least to processing units and the comparator unit makes it possible to detect permanent and transient errors. The computation of the approximation requires less expenditure and makes it possible to reduce the hardware expenditure compared to conventional redundant systems.

Advantageously, the device has a control unit that is designed to compute the first computation of the main data model on respectively one of the at least two processing units and to compute the second computation of the approximation data model associated with the main data model on the respectively other of the at least two processing units. Thus the main data model and the associated approximation data model are preferably computed on different processing units, which satisfies higher redundancy requirements.

In one advantageous specific embodiment, at least one of the at least two processing units may be designed in such a way that it computes essentially the main data models and the at least one other of the at least two processing units computes essentially the approximation data models. The control unit is advantageously designed to distribute essentially the main data models to the more powerful processing unit and the associated approximation data models to the less powerful processing unit. Depending on the complexity reduction of the approximation data model compared to the main data model, the processing unit for computing the approximation data model may be for example markedly less powerful than the processing unit for computing the main data model, as a result of which it requires markedly less silicon surface.

In another advantageous specific embodiment, at least two processing units may be designed in such a way that their computing power is similar or identical so that they are each able to compute both main data models as well as approximation data models. As a supplement to this specific embodiment, the control unit is designed to insert in each of the at least two processing units between the first computations of main data models sequentially portions of the second computations of approximation data models, the main data models and the associated approximation data models respectively being computed on preferably different processing units. As a result, the full computing capacity is no longer available for computing the main data model, but only a reduced computing capacity. The reduction of the computing capacity depends on the model reduction of the approximation data model compared to the main data model. In a high model reduction, the additional computing expenditure is comparatively low.

Advantageously, a microprocessor or microcontroller (assumed to be equivalent in the following) comprises the at least two processing units, the comparator unit as well as the possibly existing control unit. This provides an integrated solution.

In an alternative advantageous implementation, each of the at least two processing units is situated on different microprocessors. The comparator unit, which is designed to compare the first result with the second result and to determine the information about the deviation, may be situated on one of these different microprocessors within or outside of one of the processing units. The comparator unit may alternatively be situated on a separate microprocessor or on another external component.

In an advantageously supplementary embodiment, the at least two processing units are designed to determine, as a function of the state of the system, the maximally admissible deviation by computing a deviation data model, which assigns maximally admissible deviations between the main data model and the approximation data mode to states of the system. This makes it possible for the comparison in the comparator unit to take into account not only a fixed maximum deviation value for all input data of the model, but, depending on the state of the system, graduated maximum deviation values that are normally lower than the greatest maximum deviation value.

In the method for computing data models, in particular comprising the possibility to detect errors occurring during the computation, a main data model is computed as a function of at least one state of a system on at least one of the at least two processing units, an approximation data model associated with the main data model being computed as a function of the at least one state of the system on at least one other of the at least two processing units, the main data model comprising at least one property of the system as a first data model, the approximation data model comprising at least the same property of the system approximately as a second data model, a first result of a first computation of the main data model being compared with a second result of a second computation of the associated approximation data model in order to determine information about a deviation between the first result and the second result, an error being detected as a function of the information about the deviation if the deviation exceeds a maximum admissible deviation. This makes it possible to detect permanent and transient errors at a reduced hardware expenditure.

The main data models and the respectively associated approximation data models being preferably computed on different processing units. This satisfied increased redundancy requirements for detecting transient or permanent errors.

When using processing units of different power, preferably the first computations of the main data models are essentially executed on a more powerful of the at least two processing units, and the second computations of the approximation data models are essentially executed on a less powerful of the at least two processing units. As a result, the execution time of the main data models on the more powerful processing unit is similar as the execution time of the approximation data models on the less powerful processing unit. Depending on the reduction of the complexity of the approximation data models compared to the main data models, the silicon surface of the less powerful processing unit may be markedly smaller compared to the more powerful processing unit.

When using processing units of similar or identical power, preferably the first computations of the main data models are distributed to the at least two processing units and the second computations of the approximation data models are inserted between the first computations of the main data models, the respective main data models and the associated approximation data models being preferably computed on different processing units. As a result, the full computing capacity of the at least two processing units is no longer available for computing the main data models, but only a reduced computing capacity. The reduction of the computing capacity depends on the model reduction of the approximation data model compared to the main data model. Particularly in a high model reduction, the additional computing expenditure is comparatively low. Thus with an only slight reduction of the computing capacity of the processing units increased redundancy requirements are satisfied.

Preferably, as a function of the state of the system, the maximally admissible deviation is determined by computing a deviation data model, which assigns maximally admissible deviations between the main data model and the associated approximation data mode to states of the system. This makes it possible to specify a maximum deviation value graduated in accordance with the state of the system.

Further advantageous developments emerge from the following description and the drawing.

DETAILED DESCRIPTION

Figure 1:
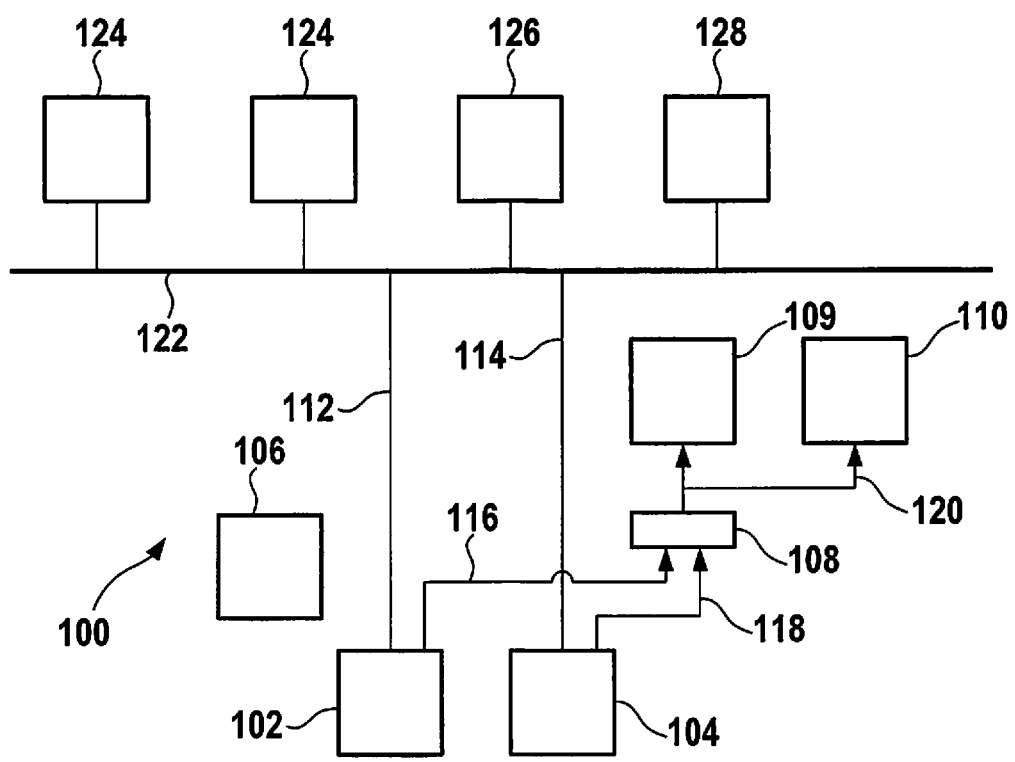
FIG. 1 shows parts of a microcontroller system in a schematic representation.

FIG. 1 schematically shows parts of a microcontroller system 100 as part of a device for error detection.

The device has at least two processing units. In the example, the device has a first processing unit 102 and a second processing unit 104.

More than two processing units may also be provided.

At least one of the at least two processing units is designed to compute a main data model as a function of at least one state of a system. At least one other of the at least two processing units is designed to compute an associated approximation data model as a function of the at least one state of the system.

The system is a physical system in the example. The state is represented for example in the form of input data for the main data model and the associated approximation data model.

The main data model and the associated approximation data model are data-based models that model properties of the physical system by monitoring and measuring the behavior of the system in a prior step. In the process, a relationship is established between input data and an output behavior. This information is stored for example as a characteristics map or as characteristics maps and may be retrieved in operation. For this purpose, it is possible to store the characteristics maps directly or in compressed form. In the direct form, the data may be read out directly in operation, intermediate values being obtained e.g. by interpolation. The compressed form, by contrast, requires a computation procedure in order to decompress the models, i.e. to compute them. Compressed models are for example the Gaussian process, in which the characteristics maps may be represented by multi-dimensional Gaussian curves. A neural network is likewise a compressed model, for example. The compressed model data, also called nodes, are typically computed in advance, that is, outside by control units, using suitable programs.

The input data of the system required for computing the main data model and the associated approximation data model as well as the model data may be stored in separate or in the same memory. The memory may be designed for example as a register or as RAM (random access memory). The input data may be supplied to the at least two processing units and/or they may be read in by the latter themselves.

The main data model comprises at least one property of the system as the first data model. The associated approximation data model comprises at least the same property of the system in approximation as the second data model. These properties are for example operating points of a unit in the system.

This means that the approximation data model is an approximation of the main data model. The accuracy of the model is thus reduced in comparison with the main data model. Depending on the model type, model data, input data, etc., a substantial reduction of the approximation data model compared to the main data model is possible, which may reach for example the factor of 10, and in special cases even clearly above that. In accordance with the model reduction, a reduction of the computing expenditure is achieved compared to the full double computation of the main data model.

The computational formula of the two models may be largely or completely identical. Processing units that are able to compute the main data model are thus also able to compute the approximation data model. The basic structure of an algorithm used for this purpose may remain fundamentally the same. Therefore it is not necessary to indicate an alternative algorithm, i.e., an alternative computational model or an alternative formula. This reduces the development expenditure since only two models of different accuracy but identical algorithm need to be computed.

In a system of two processing units of different power, only a small additional hardware circuit in the form of the less powerful processing unit and the comparator unit is necessary for the redundant computation of the approximation data models in the microcontroller system.

In a system of two processing units of similar or identical power, only the comparator unit in the microcontroller system is required as additional hardware circuit for reasons of redundant computation. Thus merely a portion of the computing capacity of already existing hardware is utilized. It is therefore not necessary to develop special alternative hardware. By the same algorithm, inaccuracies occur only through the reduced approximate data model.

The comparator unit is designed to compare a first result of a first computation of the main data model with a second result of a second computation of the approximation data model in order to determine information about a deviation between the first result and the second result, the comparator unit being designed to detect an error, as a function of the information about the deviation, if the deviation exceeds a maximally admissible deviation. The results are states, for example, which the system reaches according to the respective model due to the properties and input data.

The device has a control unit 106. In the example, the device comprises an interrupt controller of the microprocessor system, designated in the following as interrupt controller 109. For reasons of clarity, the control lines for control unit 106 and for interrupt controller 109 to the processing units are not represented graphically. Control unit 106 and interrupt controller 109 are different units in the example. Control unit 106 is designed to distribute main data models and approximation data models. Control unit 106 may be for example a separate unit or a piece of software in one of the microprocessors.

One of the microprocessors may comprise a comparator unit 108, which is designed to compare the first result with the second result, and to determine the information about the deviation. The comparator unit 108 detects the error as a function of the information about the deviation. In the figure, comparator unit 108 is situated outside of the at least two processing units, but may alternatively also be logically assigned to them.

The microprocessor system may also comprise an error detection unit 110, which detects or indicates an error type. If comparator unit 108 indicates a case of an error, error detection unit 110 may react, if indicated, with a specific error response.

Comparator unit 108 detects errors for example, interrupt controller 109 sends an interrupt in the case of detected errors and/or error detection unit 110 responds.

The state of the system is transmitted as input data for example via a first data line 112 to first processing unit 102 and via a second data line 114 to second processing unit 104. The first result is transmitted for example via a third data line 116 from first processing unit 102 to comparator unit 108. The second result is transmitted for example via a fourth data line 118 from second processing unit 104 to comparator unit 108.

A fifth data line 120 connects comparator unit 108 to control unit 106, interrupt controller 109 and/or error detection unit 110.

In the example, multiple processor cores 124, a volatile memory 126, for example a random access memory, and a non-volatile memory 128 are connected via a data bus 122 to first data line 112 and second data line 114. These may also be part of the data bus. Non-volatile memory 128 contains for example model parameters for the main data model and the approximation data model. Non-volatile memory 128 is for example a flash memory or another non-volatile random access memory.

Control unit 106 may be designed to execute the computation of at least one main data model essentially on a first processing unit, for example 102, and the computation of at least one associated approximation data model on the other processing unit, essentially on the second processing unit, for example 104.

Second processing unit 104 having a second hardware may be limited compared to first processing unit 102 having a first hardware in terms of power and/or also in terms of the accuracy of the computation, for example with respect to the supported data type, in terms of the data capacity of the data to be processed or by a limited instruction set. The second maximum data capacity is for example smaller than the first maximum data capacity. 16 bit are used for example instead of 32 bit. The second instruction set is for example reduced compared to the first instruction set. The second data type is for example fixed point compared to the floating point of the first maximum data type. The second executed operations may be for example an approximation of complex functions such exponential functions and trigonometric functions or may be read out of tables, while the first executed operations perform the computation accurately.

Alternatively, control unit 106 may be designed to perform computations of main data models on at least two of the at least two processing units, for example 102, 104, and to perform the computations of the approximation data models associated with the respective main data model on the respective processing unit that differs from the processing unit computing the main data model. The control unit may furthermore be designed sequentially to insert parts of the second computation of the approximation data model into the first computation and/or between successive computations of main data models by at least one of the at least two processing units. For example, a first, a second and a third main data model are computed. The first and the third main data model are computed in the first processing unit 102. Furthermore, for example, the second main data model is computed in second processing unit 104. The first approximation data model associated with the first main data model is inserted and computed for example in second processing unit 104 is such a way that first the execution of the second main data model is interrupted, then the first approximation data model is executed and subsequently the execution of the second main data model is resumed. For example, the second approximation data model associated with the second main data model is inserted and computed in first processing unit 102 between the first and the third main data model without thereby interrupting one of these main data models. As a result, the full computing capacity of processing units 102 and 104 is no longer available for computing the main data models, but only a reduced computing capacity. The reduction of the computing capacity depends on the model reduction of the approximation data models compared to the main data models. In a high model reduction, the additional computing expenditure is comparatively low.

A microprocessor may comprise the at least two processing units, i.e., in the example, first processing unit 102 and second processing unit 104. These may also be situated on different microprocessors.

The at least two processing units may be designed to compute, as a function of the state of the system, the maximally admissible deviation from a deviation data model, which assigns maximally admissible deviations between the main data model and the approximation data mode to states of the system. The non-volatile memory 128 in this case comprises the data of the deviation data model.

This makes it possible for the comparison to take into account not only a fixed maximum deviation value for all input data of the model, but, depending on the input data, graduated maximum deviation values that are normally lower than the greatest maximum deviation value. In order to prevent the deviation data model in the event of an error from falsely permitting excessively high deviations, it is possible for example additionally to specify also a fixed maximum value that the deviation data model must not exceed.

This allows for a further optimization. For example, a further model reduction is possible, which requires less computing power compared to the pure combination of main data model and approximation data model without deviation data model. For example, a reduction of the error deviation is possible, which allows for a higher accuracy of error detection compared to the pure combination of main data model and approximation data model without deviation data model.

The mentioned algorithms are stored for example as instructions in the at least two processing units or entirely or partially in non-volatile memory 128.

Figure 2:
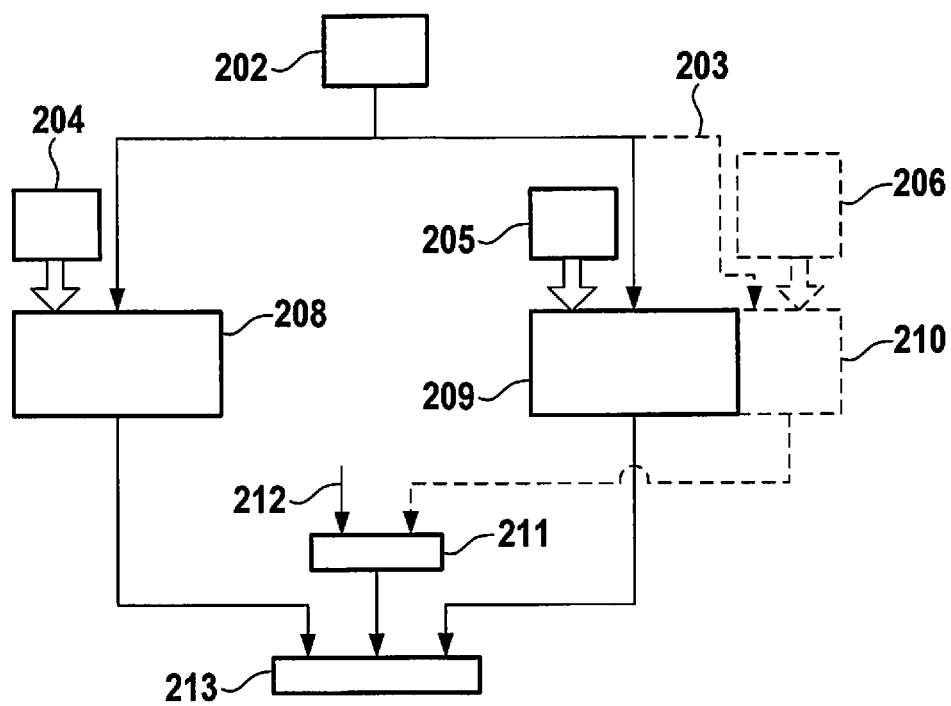
FIG. 2 shows steps for the fundamental method for error detection in a schematic representation.

The fundamental method for error detection is described below with reference to FIG. 2.

In a step 202, the input data for the main data model are transmitted to first processing unit 102 and for the associated approximation data model are transmitted to second processing unit 104.

Optionally, in a step 203, the input data for the deviation data model are preferably transmitted to second processing unit 104.

Subsequently or in parallel, in a step 204, the main data model is read in by first processing unit 102. Subsequently or in parallel, in a step 205, the associated approximation data model is read in by second processing unit 104. Optionally, in a step 206, the deviation data model is preferably read in by second processing unit 104.

After step 204, in a step 208, first processing unit 102 determines the first result for the main data model.

After step 205, in a step 209, second processing unit 104 determines the second result for the approximation data model.

Optionally, in a step 210, second processing unit 104, by computing the deviation data model, determines a deviation that is currently admissible based on the input data.

Optionally, in a step 211, the maximally admissible deviation is subsequently determined from the currently admissible deviation and a specified limitation 212 of the admissible deviation.

Subsequent to step 208 and step 209 and, optionally, subsequent to step 211, the comparison of the first result for the main data model and of the second result for the approximation data model is performed in a step 213. In step 213, the information about the deviation between the first result and the second result is determined and an error is detected as a function of the information about the deviation if the deviation exceeds the maximally admissible deviation. The maximally admissible deviation is specified for example as a fixed value. Optionally, the comparison is performed with the maximally admissible deviation determined in step 211.

Figure 3:
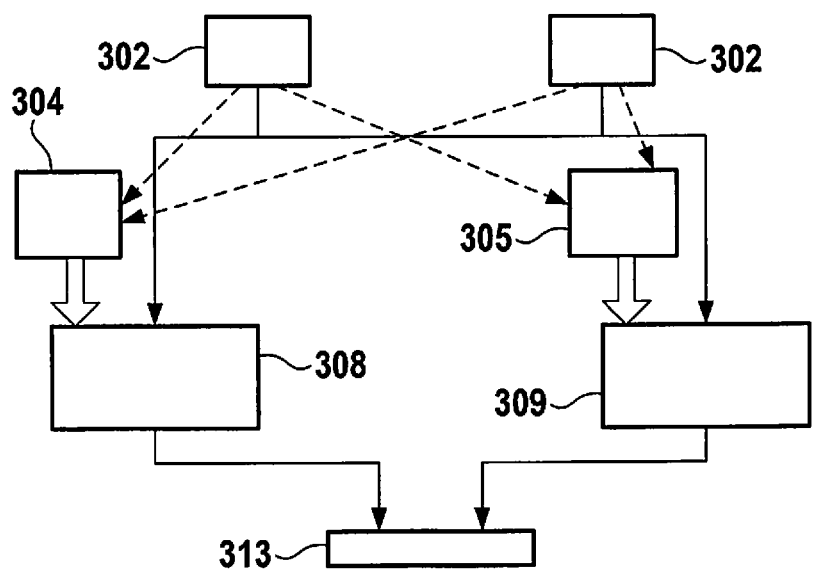
FIG. 3 shows in a schematic representation steps of the method for error detection with the aid of two processing units whose computing power is similar or identical.

FIG. 3 schematically shows steps in a second method for applying the fundamental method with the aid of two processing units, whose computing power is similar or identical, two main data models as well as the respectively associated approximation data models being computed in the process.

In a step 302, a first system state is transmitted in the form of first input data for a first main data model both to first processing unit 102 as well as for the associated first approximation data model also to second processing unit 104. Independently of this, for example simultaneously, a second system state is transmitted in the form of second input data for a second main data model both to second processing unit 104 as well as for the associated second approximation data model also to first processing unit 102.

Subsequently or in parallel, in a step 304, the first main data model and subsequently the second approximation data model is read in by first processing unit 102. It is also possible, for example, that first the second approximation data model is read in and subsequently the first main data model is read in. It is also possible, for example, that after each loading of a main or approximation data model first the subsequent method step 308 must be concluded before it is possible to read the subsequent main or approximation data model in step 304.

Subsequently or in parallel, in a step 305, the first approximation data model and subsequently the second main data model is read in by second processing unit 104. It is also possible, for example, that first the second main data model is read in and subsequently the first approximation data model is read in. It is also possible, for example, that after each loading of a main or approximation data model first the subsequent method step 309 must be concluded before it is possible to read the subsequent main or approximation data model in step 305.

After step 304, in a step 308, first processing unit 102 determines the first result for the first main data model and subsequently the second result for the second approximation data model. It is also possible, for example, that first the second result is determined for the second approximation data model and subsequently the first result is determined for the first main data model.

After step 305, in a step 309, second processing unit 104 determines the first result for the first approximation data model and subsequently the second result for the second main data model. It is also possible, for example, that first the second result is determined for the second main data model and subsequently the first result is determined for the first approximation data model.

Subsequent to step 308 and step 309, the comparison is performed in a step 313. In step 313, the information about the deviation between the first results of the respective computations of the first main data model and the first approximation data model and subsequently of the second results of the respective computations of the second main data model and the second approximation data model are determined and an error is detected as a function of the information about the deviation if the deviation exceeds a maximally admissible deviation. The maximally admissible deviation is specified for example as a fixed value.

What is claimed is:

1. A device for computing data models, comprising:
   at least two processing units, at least one of the at least two processing units computing a main data model as a function of at least one state of a system, at least one other of the at least two processing units computing, as a function of the at least one state of the system, an approximation data model associated with the main data model, wherein the main data model includes at least one property of the system as a first data model, wherein the approximation data model includes the at least one property of the system as a second data model; and
   a comparator unit that:
      compares a first result of a first computation of the main data model with a second result of a second computation of the approximation data model associated with the main data model,
      determines information about a deviation between the first result and the second result, and
      detects an error as a function of the information about the deviation if the deviation exceeds a maximum admissible deviation;
   wherein the at least two processing units compute, as a function of the state of the system, the maximum admissible deviation between the main data model and the associated approximation data model by computing a deviation data model that assigns the maximum admissible deviation to states of the system.

2. The device for computing data models as recited in claim 1, further comprising:
   a control unit for computing the first computation of the main data model on respectively one of the at least two processing units for computing the second computation of the approximation data model associated with the main data model on the respectively other of the at least two processing units.

3. The device for computing data models as recited in claim 2, wherein each of the at least two processing units, the comparator unit, and the control unit each includes a microprocessor or a microcontroller.

4. The device for computing data models as recited in claim 1, wherein the at least one of the at least two processing units computes the main data model and not the approximation data model, and wherein the at least one other of the at least two processing units computes the approximation data model and not the main data model.

5. The device for computing data models as recited in claim 1, wherein a computing power of the at least two processing units is similar or identical, and the at least two processing units each compute both the main data model as well as the approximation data model.

6. The device for computing data models as recited in claim 1, wherein each of the at least two processing units is situated on different microprocessors or microcontrollers.

7. The device for computing data models as recited in claim 6, wherein one of:
   the comparator unit is situated on one of the different microprocessors or microcontrollers within or outside of one of the processing units, and
   the comparator unit is alternatively situated on a separate microprocessor or microcontroller, or on another external component.

8. The device for computing data models as recited in claim 1, wherein the error occurs during at least one of the computing of the main data model and the computing of the approximation data model.

9. A device for computing data models, comprising:
   at least two processing units, at least one of the at least two processing units computing a main data model as a function of at least one state of a system, at least one other of the at least two processing units computing, as a function of the at least one state of the system, an approximation data model associated with the main data model, wherein the main data model includes at least one property of the system as a first data model, wherein the approximation data model includes the at least one property of the system as a second data model;
   a comparator unit that:
      compares a first result of a first computation of the main data model with a second result of a second computation of the approximation data model associated with the main data model,
      determines information about a deviation between the first result and the second result, and
      detects an error as a function of the information about the deviation if the deviation exceeds a maximum admissible deviation; and
   a control unit that distributes the main data model to a more powerful of the at least two processing unit and the associated approximation data model to a less powerful of the at least two processing units.

10. A method for computing data models, comprising:
    computing a main data model as a function of at least one state of a system on at least one of at least two processing units;

computing an approximation data model associated with the main data model as a function of the at least one state of the system on at least one other of the at least two processing units, wherein the main data model includes at least one property of the system as a first data model, wherein the approximation data model includes the at least one property of the system as a second data model;

comparing a first result of a first computation of the main data model with a second result of a second computation of the associated approximation data model in order to determine information about a deviation between the first result and the second result;

determining, as a function of the state of the system, a maximum admissible deviation between the main data model and the associated approximation data model by computing a deviation data model that assigns the maximum admissible deviation to states of the system; and detecting an error as a function of the information about the deviation if the deviation exceeds the maximum admissible deviation.

11. The method for computing data models as recited in claim 10, wherein the at least one of the at least two processing units computes the main data model and not the approximation data model, and wherein the at least one other of the at least two processing units computes the approximation data model and not the main data model.

12. The method for computing data models as recited in claim 10, wherein the at least two processing units are of similar or identical power, the first computation of the main data model is distributed to the at least two processing units and the second computation of the approximation data model is inserted between portions of performance of the first computation of the main data model.

13. The method for computing data models as recited in claim 10, wherein the error occurs during at least one of the computing of the main data model and the computing of the approximation data model.

14. A method for computing data models, comprising:
computing a main data model as a function of at least one state of a system on at least one of at least two processing units;
computing an approximation data model associated with the main data model as a function of the at least one state of the system on at least one other of the at least two processing units, wherein the main data model includes at least one property of the system as a first data model, wherein the approximation data model includes the at least one property of the system as a second data model;

comparing a first result of a first computation of the main data model with a second result of a second computation of the associated approximation data model in order to determine information about a deviation between the first result and the second result; and detecting an error as a function of the information about the deviation if the deviation exceeds a maximum admissible deviation;

wherein the at least two processing units are of different power, the first computation of the main data model is executed on a more powerful of the at least two processing units, and the second computation of the approximation data model is executed on a less powerful of the at least two processing units.

15. A non-transitory machine-readable storage medium that includes instructions that when executed on a computer results in a performance of method for computing data models, the method comprising:
computing a main data model as a function of at least one state of a system on at least one of at least two processing units;
computing an approximation data model associated with the main data model as a function of the at least one state of the system on at least one other of the at least two processing units, wherein the main data model includes at least one property of the system as a first data model, wherein the approximation data model includes the at least one property of the system as a second data model;

comparing a first result of a first computation of the main data model with a second result of a second computation of the associated approximation data model in order to determine information about a deviation between the first result and the second result;

determining, as a function of the state of the system, a maximum admissible deviation between the main data model and the associated approximation data model by computing a deviation data model that assigns the maximum admissible deviation to states of the system; and detecting an error as a function of the information about the deviation if the deviation exceeds the maximum admissible deviation.

\* \* \* \* \*